United States Patent [19]

Nakamura et al.

[11] 4,118,892
[45] Oct. 10, 1978

[54] CONNECTABLE NURSERY BOX STRUCTURES HAVING COMPARTMENTALIZING GRIDS

[75] Inventors: Tsugio Nakamura, Funabashi; Seigo Aizaki, Koshigaya; Kosei Hayashi, Hitachi, all of Japan

[73] Assignees: Sekisui Kagaku Kogyo Kabushiki Kaisha, Osaka; Kabushiki Kaisha Hayashi Zoen, Hitachi, both of Japan

[21] Appl. No.: 765,479

[22] Filed: Feb. 4, 1977

[30] Foreign Application Priority Data

Feb. 6, 1976 [JP] Japan .............................. 51-13531[U]
May 28, 1976 [JP] Japan .............................. 51-69141[U]
Aug. 20, 1976 [JP] Japan .............................. 51-112377[U]

[51] Int. Cl.² ........................ A01G 9/02; A01G 9/12
[52] U.S. Cl. .......................................... 47/66; 47/33; 47/39; 47/83; 47/86; 220/23.4
[58] Field of Search ................... 47/1 R, 56, 9, 33, 66, 47/73, 74, 75, 82, 83, 85, 86, 87, 39; 220/21, 22, 23.4

[56] References Cited

U.S. PATENT DOCUMENTS

| 61,479 | 1/1867 | Smith .................................. 47/85 |
| 1,631,802 | 6/1927 | Evert .................................. 47/66 |
| 1,743,987 | 1/1930 | Tinaglia .............................. 47/39 |
| 1,905,176 | 4/1933 | Kieckhefer ...................... 47/1 X |
| 2,113,523 | 4/1938 | White ................................. 47/33 |
| 2,121,173 | 6/1938 | MacPherson .................... 47/33 |
| 2,134,647 | 10/1938 | Savage ............................. 47/66 |
| 2,219,870 | 10/1940 | Jacobus ............................ 47/66 |
| 2,279,735 | 4/1942 | Gates ................................. 47/33 |
| 2,741,875 | 4/1956 | van Staalduinen ............ 47/75 |
| 3,056,232 | 10/1962 | Chaplin ............................ 47/87 |
| 3,092,284 | 6/1963 | Stout ................................. 220/21 |
| 3,353,704 | 11/1967 | Belcher et al. ............... 220/22 X |
| 3,366,265 | 1/1968 | Hesselbarth .................... 220/23.4 |
| 3,386,608 | 6/1968 | Diller .............................. 47/86 X |
| 3,744,661 | 7/1973 | Fischer, Jr. ..................... 220/21 |
| 3,857,342 | 12/1974 | Johns .......................... 220/23.4 X |

FOREIGN PATENT DOCUMENTS

| 59,737 | 1/1913 | Austria ....................... 220/23.4 |
| 144,061 | 12/1935 | Austria ......................... 47/39 |
| 2,220,179 | 11/1974 | France ........................... 47/9 |
| 1,216,606 | 5/1966 | Fed. Rep. of Germany .... 47/83 |
| 1,941,315 | 2/1971 | Fed. Rep. of Germany .... 47/87 |
| 2,236,288 | 2/1973 | Fed. Rep. of Germany .... 47/56 |
| 2,342,939 | 3/1975 | Fed. Rep. of Germany .... 47/39 |
| 172,252 | 9/1934 | Switzerland .................... 47/83 |
| 474,210 | 8/1969 | Switzerland .................... 47/83 |
| 1,416,874 | 12/1975 | United Kingdom ........... 47/85 |
| 468,613 | 4/1975 | U.S.S.R. ......................... 47/85 |

Primary Examiner—Ernest T. Wright, Jr.
Assistant Examiner—Steven A. Bratlie
Attorney, Agent, or Firm—Sughrue, Rothwell, Mion, Zinn and Macpeak

[57] ABSTRACT

A molded synthetic resin nursery box B comprises a grid member 2 dividing the box into individual compartments 3 communicating with each other through side wall apertures 23. A wavy bottom plate 12 of the box has drainage holes 13 therein, and the grid member side walls are notched at their top edges. Adjacent boxes are connected by engaging projections 4 on one box with mating slots 5 on another box. The planted boxes may be installed on a horizontal surface whereby the grid members bear the weight of a person walking thereon to prevent trampling and plant damage, or vertically by mounting the boxes in assembled, stacked frames 100 filled with soil. Alternatively, the grid members may be made separate from the bottom plate and side wall 11 bases, and snap-connected to pedestals 14 upstanding from the bottom plates after planting.

7 Claims, 10 Drawing Figures

CONNECTABLE NURSERY BOX STRUCTURES HAVING COMPARTMENTALIZING GRIDS

BACKGROUND OF THE INVENTION

This invention relates to connectable, compartmented nursery or planter boxes having weight supporting grids therein, which may be permanently or temporarily installed after initial cultivation in either horizontal or vertical arrangements. Nursery boxes for growing and transplanting previously cultivated plants, such as lawn grass, flowers, etc. to provide an "instant environment" are well known. With the prior art boxes, however, a substantial amount of soil preparation is necessary before transplanting and installing such boxes, and considerable time and cost is thus involved. Furthermore, such transplanted lawns, flower beds, etc. are subject to trampling and damage when a person walks on them.

Recently, a need has arisen for the transplanting and installation of pre-cultivated lawn grasses and the like on concrete, asphalt, hard ground, or even building roofs, to provide temporary displays for entertainment or special events, wherein the nursery boxes can be easily removed after use.

SUMMARY OF THE INVENTION

It is therefore an object of this invention to provide a nursery box construction which eliminates the prior art drawbacks and satisfies the need mentioned above.

Briefly, and in accordance with the present invention, a molded synthetic resin nursery box comprises a grid member dividing the box into individual compartments communicating with each other through side wall apertures. A wavy bottom plate of the box has drainage holes therein, and the grid member side walls are notched at their top edges. Adjacent boxes are connected by engaging projections on one box with mating slots on another box. The planted boxes may be installed on a horizontal surface whereby the grid members bear the weight of a person walking thereon to prevent trampling and plant damage, or vertically by mounting the boxes in assembled, stacked frames filled with soil. Alternatively, the grid members may be made separate from the bottom plate and side wall bases, and snap-connected to pedestals upstanding from the bottom plates after planting.

DETAILED DESCRIPTION OF THE PREFERRED EMBODIMENTS

Figure 1:
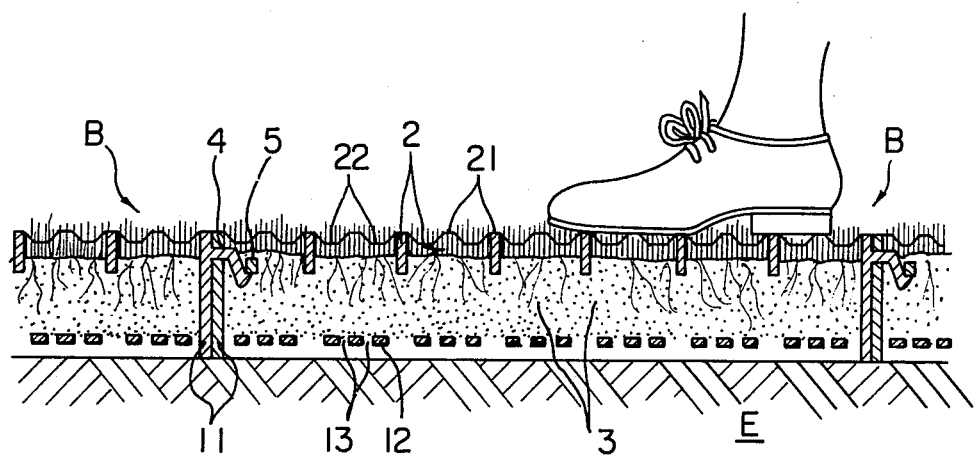
FIG. 1 shows a vertical sectional view of installed, connected plant nursery boxes according to the present invention.

Referring now to the drawings, the gardening structure embodiment according to FIGS. 1 - 4 is constituted by a plurality of adjacently arranged plant nursery boxes, B, B overlying a ground surface E. Each plant box B basically comprises a housing 1 composed of four side walls 11, a bottom plate 12, and a grid member 2. The grid member has substantially the same height as that of the side walls 11, and thus defines a plurality of separate and divided but communicating compartments 3. The grid member 2 and side walls 11 have notches or recesses 22 on their upper surfaces 21, and communicating holes 23 in the lower portions of their side walls. At least one recess 22 should be intermittently provided on the grid member 2 and the side wall 11 surrounding each compartment 3, as in the embodiment of FIG. 5. Further, the shape of the recesses 22 is not limited to the angular form shown in FIG. 4, but may be rounded as in FIG. 5. However, it is preferable that the depth of each recess be approximately 5 mm, and that the holes 23 in the grid member 2 be as large as possible so that the plant roots can spread and extend therethrough. The holes 23 in the side walls 11 are preferably formed as a plurality of elongated vertical slots to prevent the soil from dropping or escaping therefrom.

The bottom plate 12 has drainage holes 13 formed therein below each compartment 3. The drainage holes 13 should be large enough to permit water flow, and are preferably formed as a plurality of lengthwise narrow slots so that the plant roots can grow through them and then become twisted or entwined together. Further, it is preferable that the bottom plate 12 is formed in a wavy or undulating manner such that each compartment 3 includes at least one wave-form portion which has its maximum height in the center of the compartment. Thus, when the housing or box 1 is positioned on the ground, a gap of about 10 mm can be formed between the ground and the center portion of each compartment, whereby the plant roots become well twisted around the bottom plate and the gap form an air passage which enhances the oxygen supply to the roots. The housing 1 and grid member 2 must be sufficiently strong to support a person's weight. In the embodiment of FIGS. 1 - 4, each box B is integrally formed by the injection molding of synthetic resin, such as polyethylene, polypropylene, synthetic rubber, polyvinyl chloride, polyamide, polycarbonate, etc. The compartments 3 may have any desired shape, such as square, rhombic, circular, rectangular, etc., and should be sufficiently small so that person's shoes cannot enter therein. The depth of housing 1 can be selected in accordance with the height of the plants to be used. If lawn grass is planted, it is preferable to limit the depth to about 60 - 80 mm. Further, if water retention is required, it is preferable that the housing 1 has a depth of 150~200 mm, that the holes 23 in the side walls 11 are disposed in the middles of the walls, and that the holes 13 in the bottom plates 12 are made as small as possible in order to prevent the plants roots from rotting or decaying.

The overall gardening structure is constituted by arranging a plurality of plant nursery boxes side by side in a single plane. The connection of adjacent boxes is carried out by engaging projections 4 on the side wall 11 of one box with mating slots 5 on the side wall 11 of another box.

Figure 2:
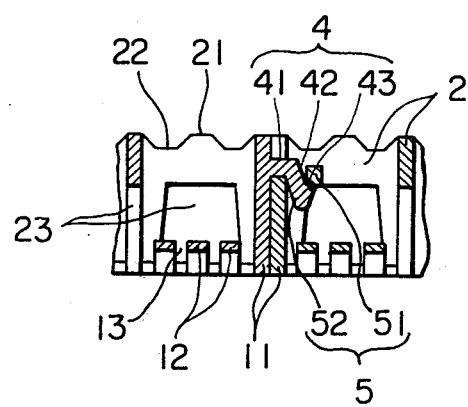
FIG. 2 shows an enlarged, partially sectional view of the connecting structure shown in FIG. 1.
Figure 3:
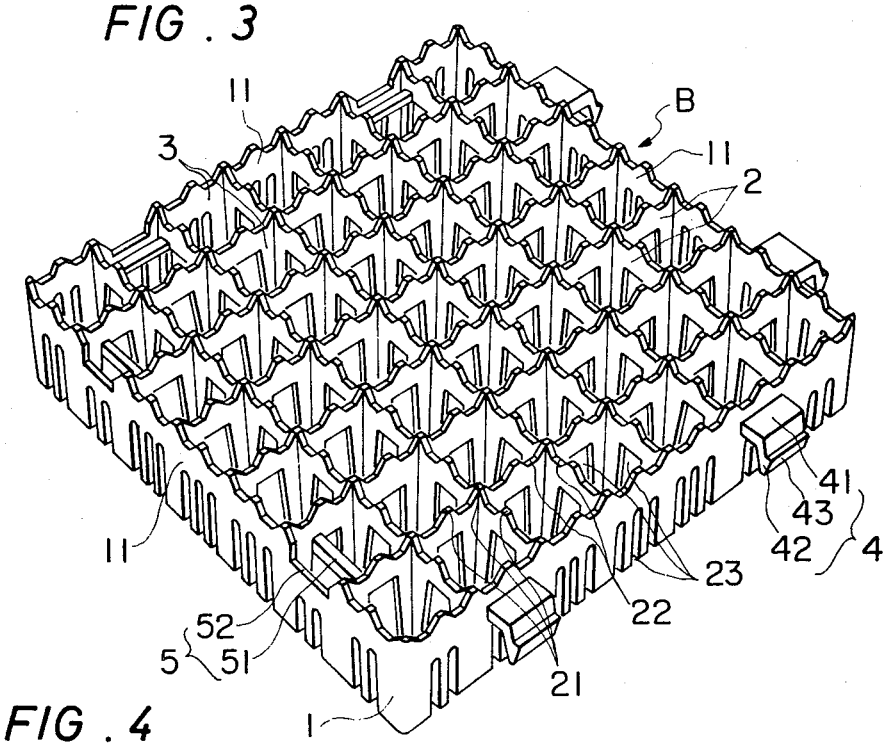
FIG. 3 shows a perspective view of an individual box of the type shown in FIG. 1.
Figure 4:
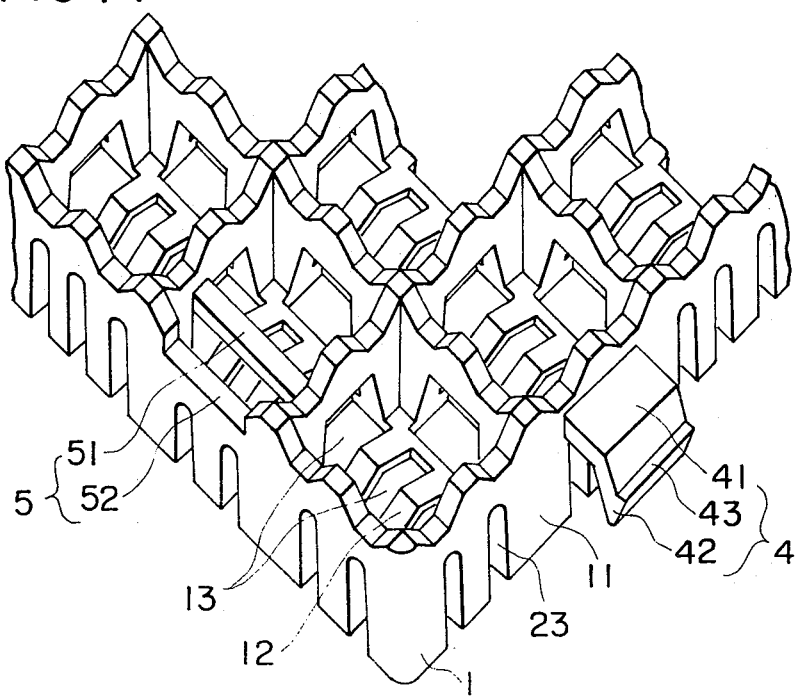
FIG. 4 shows an enlarged, partial perspective view of FIG. 3.

Each projection 4 includes a tab 41 protruding outwardly from the face of the side wall, and a downwardly bent end portion 42 having a flat ledge 43. Each slot 5 includes a bar 51 bridged between opposite side walls of the grid member 2, and a notch 52 in the adjacent side wall 11. The projections 4 of one box B are engaged with the slots 5 of an adjacent box B as shown in FIGS. 1 and 2, with each tab 41 overlying a notch 52 and the ledges 43 of the end portions 42 underlying the bars 51. The projections 4 and slots 5 are provided on opposite side walls 11, as shown in FIG. 3, whereby a plurality of nursery boxes may be easily connected together in both lengthwise and crosswise configurations.

Figure 5:
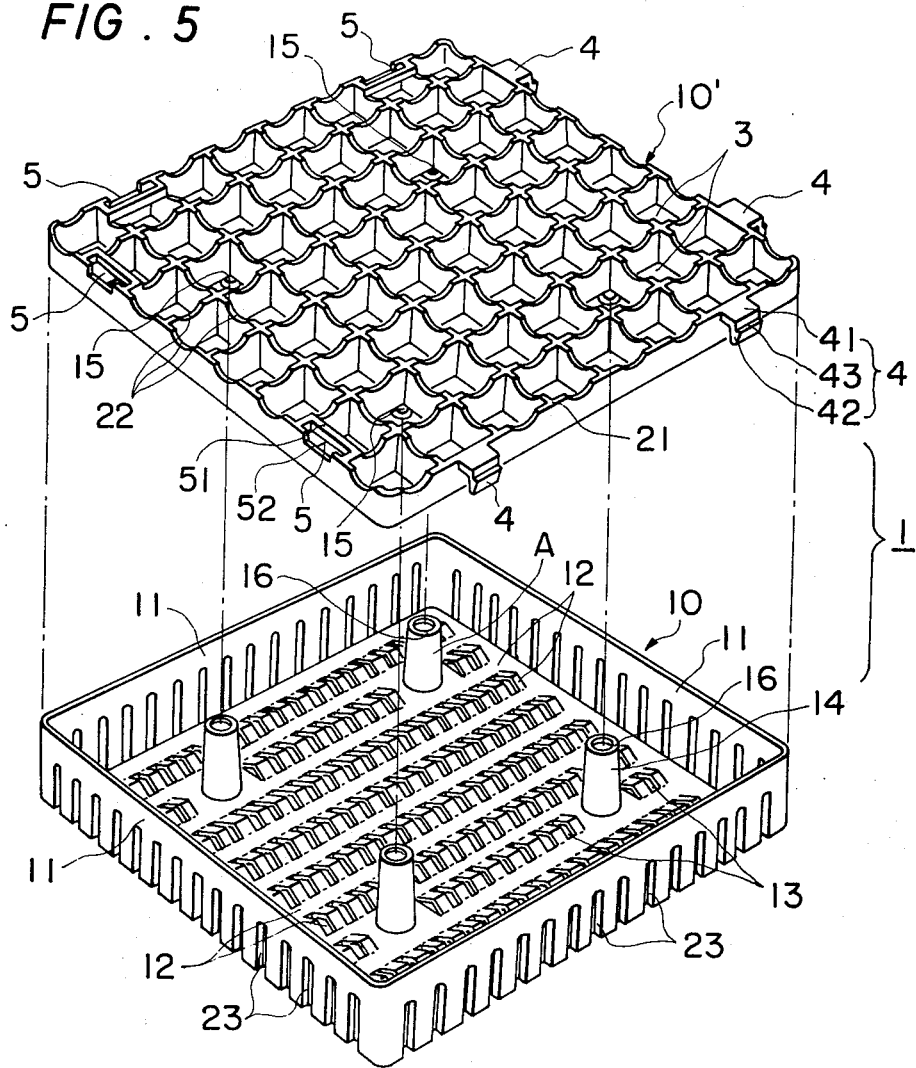
FIG. 5 shows an exploded perspective view of another plant nursery box embodiment according to the invention.
Figure 6:
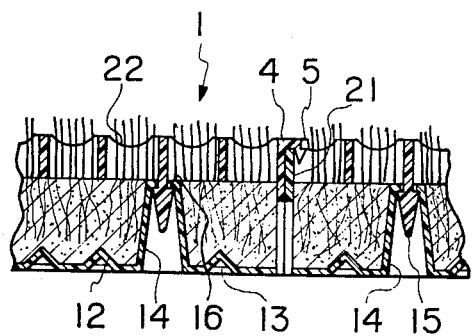
FIG. 6 shows a vertical sectional view of connected boxes of FIG. 5.

In the embodiment shown in FIGS. 5 and 6, each box comprises a lower housing 10 and an upper grid member 10', which are formed separate from each other. FIG. 6 shows a partial section view illustrating the connection between adjacent boxes and the assembly of the grid members 10' onto the lower housing 10. Each housing 10 includes four side walls 11, a bottom plate 12 and pedestals 14. Each side wall 11 has a plurality of slot-like holes 23 in the lower portion thereof, and the bottom plate 12 has a plurality of water drainage holes 13, as in the first embodiment. The pedestals 14 have central apertures 16, and protrude upwardly perpendicular to the bottom plate 12. On the bottom of the grid member 10', projections 15 corresponding to the pedestal apertures 16 are provided. When assembled together, the lower portion of the grid member 10' contacts the upper surface of the pedestals 14 and is supported thereby. The end portion of each projection 15 has a conical shape whose base is slightly larger than the diameter of an aperture 16, whereby secure snap-engagement is implemented.

The assembled grid member 10' and lower housing 10 must have sufficient strength to support a person's weight, and these components may be separately produced from the same materials and in the same manner as described above in connection with the first embodiment.

The grid member 10' and lower housing 10 may be initially assembled together, and then filled with soil, planted, placed in a greenhouse for controlled initial growth, etc. However, it is usually more advantageous to first fill the housing 10 with soil, plant seeds or seedlings, induce some initial germination or growth, etc., and then assemble the grid member 10', either before or after the boxes have been taken to and/or installed in their final site or location. Since it is difficult to plant or cultivate in the narrow compartments 3 after assembling the grid member, planting is usually done in the open lower housing 10 before the grid member is assembled thereto.

In installing a lawn planting, for example, the ground surface is first prepared by appropriate leveling to eliminate any concave or convex portions. The individual nursery boxes are then arranged as desired, and the projections 4 and slots 5 of adjacent boxes are engaged with each other. To install the open housings 10, after they are arranged as desired in both the lengthwise and crosswise directions, the grid members 10' are snap-connected thereto and at the same time the adjacent grid members are engaged with each other.

The grass roots grow through the holes 23 in the side walls 11 and the holes 13 in the bottom plates 12, whereby the lawn gradually thickens and the roots enter the underlying ground soil. When a person walks on the planted lawn box, his weight is supported by the side walls 11, the grid member 10', and the pedestals 14, as well as by the soil beneath the grid member, and therefore the lawn grass and soil cannot be directly trampled down. Further, new sprouts, buds or leaves can grow through the recesses 22 in the upper surfaces 21, whereby the plants remain healthy and green without being damaged. The boxes can be installed even on places having no soil, such as the roof of a building, and can be temporarily installed, such as for a special entertainment event, and then removed afterwards. If the underlying floor or surface must be protected, a waterproof sheet may be placed under the boxes.

Only the lower housing 10 may be used in places where people do not walk. Further, if a normal lawn already exists, only the grid members 10' may be used to protect the lawn by engaging a plurality of such grid members. If the grid member 10' is so used only as a protecting frame, it is desirable to provide cut-out portions in the lower edges of the side walls for communicating with adjacent compartments 3.

Although the gardening structure in the above embodiments is installed on a horizontal plane, the concepts of the invention are also applicable to a generally vertical installation, as described hereinafter.

Figure 7:
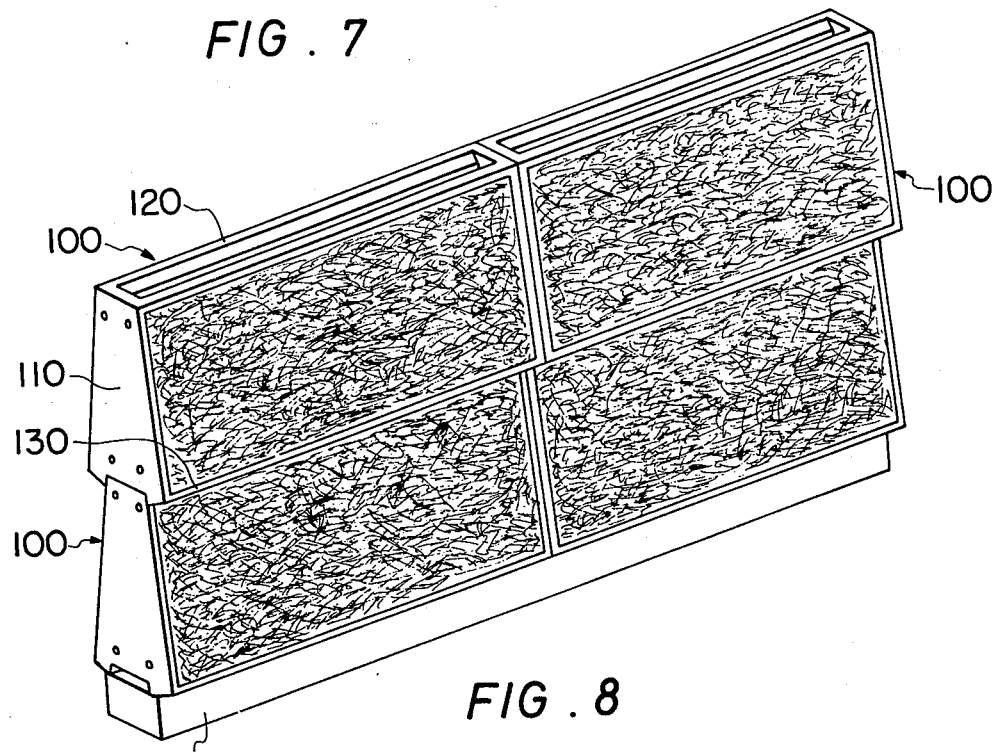
FIG. 7 shows a perspective view of vertically arranged planter boxes mounted on top of a standing wall.
Figure 8:
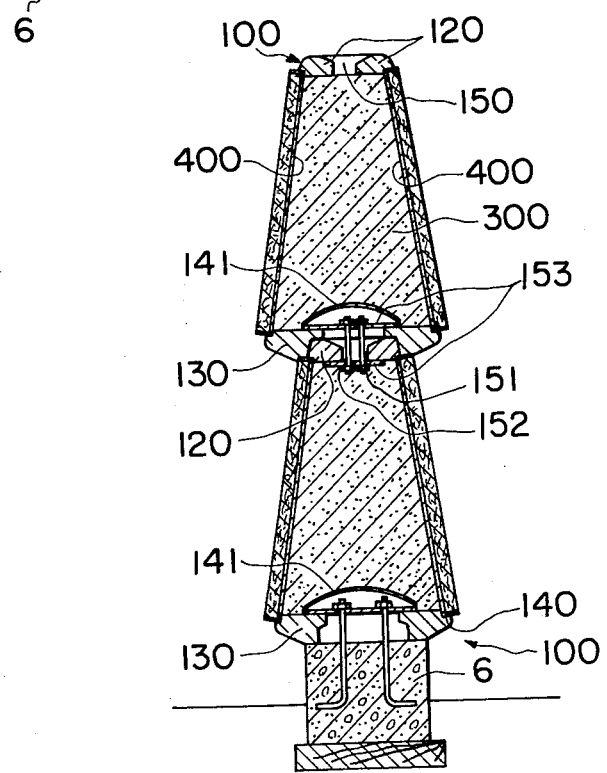
FIG. 8 shows a vertical sectional view of FIG. 7.
Figure 9:
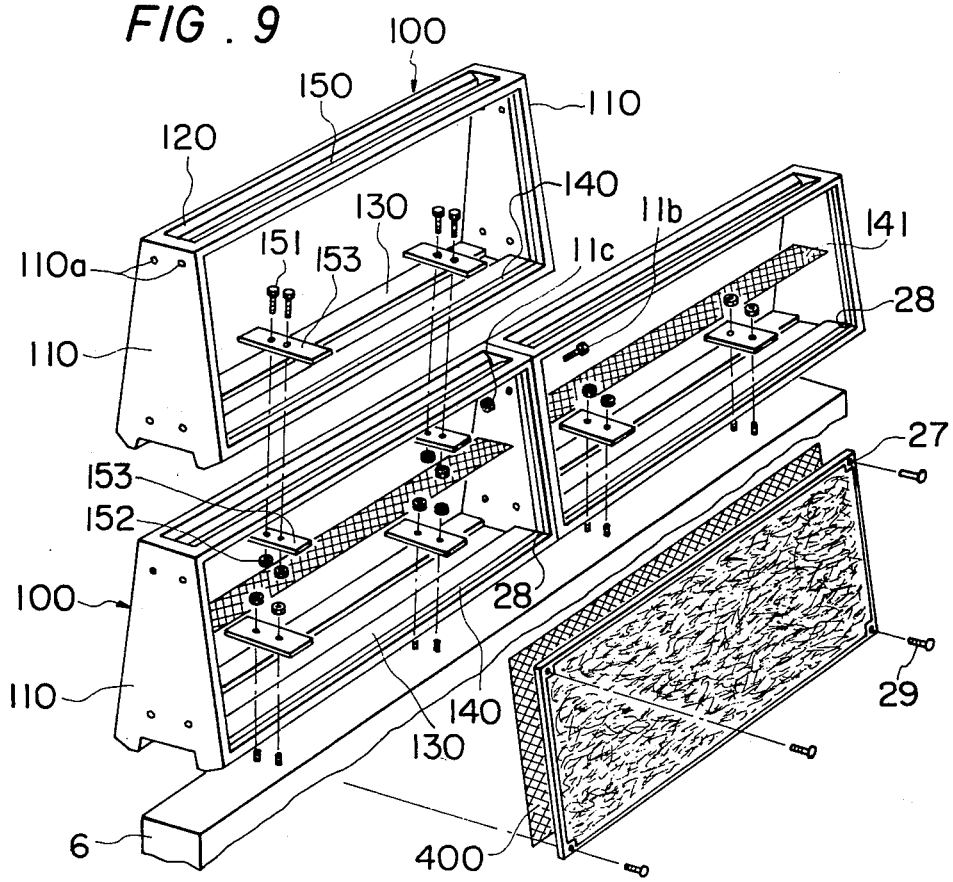
FIG. 9 shows an exploded view of the boxes of FIGS. 7 and 8, illustrating the structural assembly or installation procedure therefor.

In the embodiment of FIGS. 7 - 9, reference numeral 100 denotes a frame constructed by two trapezoidal end plates 110, ceiling plates 120, and bottom plates 130. Step-like recesses 140 are formed in the outer edges of the end plates, ceiling plates, and bottom plates, and nursery boxes are supported by and secured within such recesses, as best shown in FIG. 8. The overall assembly is mounted on top of a standing wall 6.

The trapezoidal end walls 110 are inclined at an angle of 75° – 80° to the horizontal, and the standing wall 6 is preferably substantially perpendicular to the ground. Inclination angles below 80° are more effective for proper plant growth.

The inside of each frame 100 may be empty, but it is preferable to fill them with soil 300 to further promote root growth. The soil may be placed in the frames after they are mounted to the standing wall. To prevent the soil from dropping out of the box or settling, net members 400 may be installed in the step-like recesses 140 on the sides of the frames. For proper water retention and sound prevention the soil 300 may contain urethane, peatmoss, etc. Since the planted surface is substantially vertical it is difficult to supply water to the nursery boxes, and therefore the ceiling plates 120 have a lengthwise gap 150 in order to supply water to the soil 300 from above.

Preferably, the ceiling plates 120 are sloped inwardly toward the gap 150 to channel water inside the frame 100. A longitudinal drainage gap is provided between the bottom plates 130, and is covered with a net member 141 for preventing the soil from escaping.

The frame 100 may be made of steel, synthetic resin, concrete reinforced with PC-steel wire, etc. The latter is preferable since it can be easily produced and the resulting frame has high durability.

Each end plate 110 includes a plurality of holes 110a for connecting adjacent frames to each other via nuts and bolts 11b, 11c.

In assembling a plurality of frames to a standing wall, the frames are perpendicularly connected by placing one frame on top of another frame, and then securing the bottom plate of the former to the ceiling plate of the latter by bolts 151, nuts 152 and cross-plates 153. Such placement or stacking is facilitated by the bottom plates 130 being configured to matingly receive the ceiling plates 120 of the frame below, as best shown in FIG. 8. The adjacent frames are then connected by bolts and nuts 11b, 11c through the holes 110a in the end plates. The lowest frame 100 is secured to the standing wall 6 by imbedded bolts extending upwardly therethrough.

Nursery boxes may be mounted on both side faces of the frames 100 or on only one side face, according to the type of installation desired.

Figure 10:
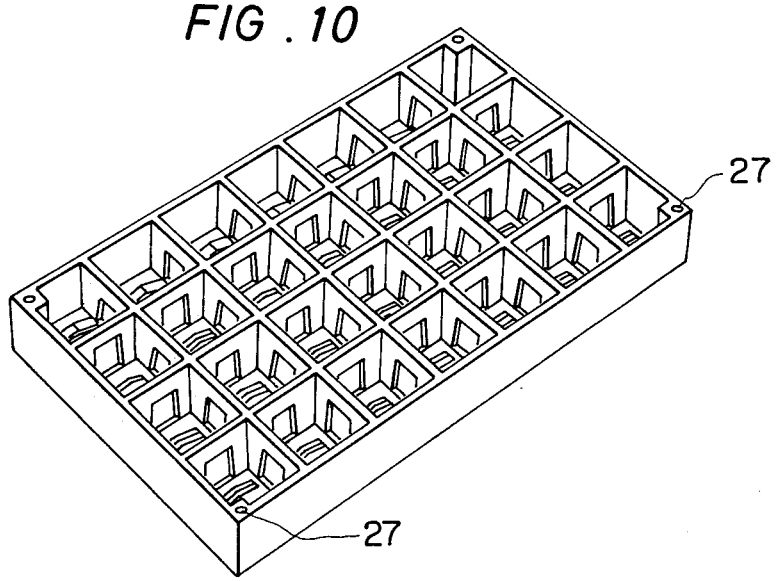
FIG. 10 shows a perspective view of still another plant nursery box embodiment according to the invention, particularly adapted for vertical installation in the frame structure of FIGS. 7-9.

The nursery boxes shown in either FIG. 1 or FIG. 5 may be used, or a specifically adapted nursery box as shown in FIG. 10 may be used. The latter is provided with corner holes 27 for easy attachment to the side faces of the frame 100, via bolts 29 and mounted or embedded nuts 28, and omits the projections 4 and slots 5 shown in FIGS. 1 and 5. Further, it is not necessary to provide any through-holes 23 in the side walls, and notches and recesses 22 may be provided on the upper surfaces of the grid member 2 and the side walls 11.

What is claimed is:

1. A plant nursery box for permanently planting lawn grasses or the like and for protecting the plants from trampling due to people walking thereon comprising a base housing defined by four side walls and an apertured bottom plate, said apertured bottom plate having a wavy configuration, said sidewalls having interlocking means for selectively securing together a plurality of said nursery boxes, a grid member integrally formed with said base housing, said grid member comprising a plurality of intersecting wall members disposed within the base housing and defining a plurality of rectangular compartments therein with the maximum wave height of said bottom plate being midway between two of the parallel walls defining a compartment, each of said wall members defining each compartment having at least one elongated, vertical slot in the bottom edge thereof and notches in the upper edge thereof at each compartment site, whereby plant root structures below the soil and plant growth above the soil in each compartment may communicate between adjacent compartments, said compartments being sufficiently small to prevent a person's foot from entering thereinto and said integrally formed grid member and base housing having sufficient mechanical strength to support a person's weight.

2. A nursery box as defined in claim 1, wherein said interlocking means comprises on two adjacent sides of the box laterally projecting tabs, and on the two remaining adjacent sides mating, tab engaging slots, whereby a plurality of boxes may be connected together in a desired configuration.

3. A nursery box as defined in claim 2, wherein each tab comprises a horizontal projection, a downwardly bent member extending from the end of the projection, and a horizontal ledge defined in the outer edge of the downwardly bent member, and each slot comprises a recess in a side wall, and a ledge engaging bar member bridged between opposite wall members of a compartment and spaced inwardly from the recess.

4. The combination of a plurality of plant nursery boxes for permanently planting lawn grasses or the like and a frame structure for supporting and mounting the nursery boxes, each of said plant nursery boxes comprising a base housing defined by four side walls and an apertured bottom plate, said apertured bottom plate having a wavy configuration, a grid member integrally formed with said base housing, said grid member comprising a plurality of intersecting wall members disposed within the base housing and defining a plurality of rectangular compartments therein with the maximum wave height of said bottom plate being midway between two of the parallel walls defining a compartment, each of said wall members defining each compartment having at least one elongated, vertical slot in the bottom edge thereof and notches in the upper edge thereof at each compartment site, whereby plant root structures below the soil and plant growth above the soil in each compartment may communicate between adjacent compartments, said frame structure comprising a pair of oppositely disposed end plates having inwardly inclined sides, a first pair of spaced, parallel bar members joining the opposite upper corners of the end plates and defining an elongated watering space therebetween, a second pair of spaced, parallel bar members joining the opposite lower corners of the end plates and defining an elongated drainage space therebetween, and means to matingly receive and mount said plurality of nursery boxes on each side of the frame structure in the space defined by an upper first bar member, a lower second bar member, and the inclined opposite sides of the end plates.

5. A frame structure as defined in claim 4, wherein the end plates have isosceles trapezoid shapes, and each second bar member is recessed along its lower inner edge so as to matingly receive said first pair of parallel bar members, whereby two frame structures may be vertically stacked together.

6. A frame structure as defined in claim 5, wherein each frame structure side space and the drainage space are covered with mesh members, whereby soil may be placed and retained in the frame structure.

7. A frame structure as defined in claim 6, wherein the means to matingly receive and mount said nursery boxes comprises elongated grooves defined in the edge of each bar member and end plate side defining a frame structure side space, and means for securing a nursery box to each side space.

* * * * *